(12) United States Patent
Vorhis (10) Patent No.: US 10,479,574 B2
(45) Date of Patent: Nov. 19, 2019

(54) REUSABLE CABLE TIE (71) Applicant: Daniel J. Vorhis, Freeland, WA (US)

(72) Inventor: Daniel J. Vorhis, Freeland, WA (US)

(*) Notice: Subject to any disclaimer, the term of this patent is extended or adjusted under 35 U.S.C. 154(b) by 83 days.

(21) Appl. No.: 15/859,201

(22) Filed: Dec. 29, 2017

(65) Prior Publication Data
US 2018/0201421 A1 Jul. 19, 2018

Related U.S. Application Data (60) Provisional application No. 62/499,074, filed on Jan. 17, 2017.

(51) Int. Cl.
B65D 63/10 (2006.01)

(52) U.S. Cl.
CPC ..... *B65D 63/1081* (2013.01); *B65D 63/1054* (2013.01); *B65D 2563/103* (2013.01); *B65D 2563/107* (2013.01); *Y02W 30/807* (2015.05)

(58) Field of Classification Search
CPC ............ B65D 63/1081; B65D 63/1054; B65D 2563/103; B65D 2563/107; Y10T 24/1498; Y10T 24/153; F16L 3/2336
See application file for complete search history.

(56) References Cited

U.S. PATENT DOCUMENTS

| 2,979,794 | A | 4/1961 | Bartolo |
| 3,049,771 | A | 8/1962 | Litwin et al. |
| 3,581,347 | A | 6/1971 | Verspieren |
| 3,837,047 | A | 9/1974 | Bunnell |
| 3,842,688 | A | 10/1974 | Baginski |
| 3,991,444 | A | 11/1976 | Bailey |
| 5,799,376 | A | 9/1998 | Harsley |
| 6,226,839 | B1 * | 5/2001 | Sayegh ................. B65D 63/06 24/16 PB |

(Continued)

FOREIGN PATENT DOCUMENTS

| CN | 202704192 U | 1/2013 |
| CN | 105857911 A1 | 8/2016 |
| KR | 20150010099 B1 | 1/2015 |

OTHER PUBLICATIONS

International Search Report and Written Opinion dated Jun. 28, 2018, issued in corresponding International Application No. PCT/US2018/013905, filed Jan. 16, 2018, 6 pages.

(Continued)

*Primary Examiner* — Robert Sandy
(74) *Attorney, Agent, or Firm* — Christensen O'Connor Johnson and Kindness, PLLC (57) ABSTRACT Generally described, aspects of the disclosed subject matter are directed to removable cable ties for bundling of cables or the fastening of objects. In accordance with aspects of the present disclosure, the removable cable tie generally includes an elongate web, a first tooth and a second tooth projecting bilaterally from the web, and a retaining portion positioned at a first end of the web comprising a first leg and a second leg spaced apart to form a c-shaped pocket. The pocket is configured to receive the web and allow sliding movement of the web in a first direction, while preventing the sliding movement of the web in a second direction opposite the first direction. In some configurations, the cable tie may be disassembled and reused by twisting the web within the pocket to release the web.

15 Claims, 9 Drawing Sheets (56) References Cited

U.S. PATENT DOCUMENTS

| | | |
|---|---|---|
| 7,513,017 B2 | 4/2009 | Stewart et al. |
| 2002/0079409 A1 | 6/2002 | Fraley, II et al. |
| 2007/0033772 A1 | 2/2007 | Brownlee et al. |
| 2010/0212118 A1* | 8/2010 | Shigematsu ......... A61G 7/0503 24/17 A |
| 2015/0121680 A1 | 5/2015 | Frishberg |

OTHER PUBLICATIONS

"Cable Ties and Fixings," HellermannTyton Catalogue, HT-Cat_2018_2019_1_4_082-082_Com.pdf, <https://www.hellermanntyton.com/downloads/product-catalogue> [retrieved Dec. 22, 2017], 3 pages.

"Cable Ties Inside Serrated With One-Hand Release Mechanism REZ200," <https://www.hellermanntyton.com (products/cable-ties-releasable/rez200/115-40200> [retrieved Dec. 22, 2017], 6 pages.

* cited by examiner

REUSABLE CABLE TIE

CROSS-REFERENCE TO RELATED APPLICATION

This application claims the benefit of U.S. Provisional Patent Application No. 62/499,074, filed Jan. 17, 2017, the disclosure of which is hereby expressly incorporated by reference herein in its entirety.

BACKGROUND

A cable tie can generally refer to a variety of tying apparatuses, including tie straps, zip ties, wire ties, hose ties, bundling ties, and the like. Some cable ties were originally designed to bundle and organize electric cables, but have become widely used in home, agriculture, industry, automotive, and many other fields. Cable ties can be used to replace twine or rope in some instances where ease of cinching to the desired tightness is desired. Many cable ties are weatherproof and provide a more secured attachment than some hand-tied knots.

A typical cable tie design includes a head having a toothed, locking pawl inside an aperture, and a flexible strap having a series of transverse-oriented teeth. When one end of the strap is inserted into the aperture, the pawl engages the strap teeth in a deflecting ratcheting motion, which effectively secures the strap into a loop which can be further adjusted to the desired diameter and tightness by pulling on the strap. In this example, the pawl is configured to prevent the loop from enlarging and effectively loosening around an object or bundle of objects, and only allows a further decrease in diameter as the cable tie is cinched.

Conventional cable ties are a locking type, which are designed to secure the pawl in a manner difficult to release once engaged. The cable tie must usually be completely severed, and subsequently destroyed, to release the object or bundle. By contrast, designs for multiple-use cable ties are available, which permit release of the pawl, often by a lever or extension pivoting the pawl out of engagement with the teeth on the strap. The strap portion is then free to slide out of the aperture for reuse.

The insertion of the strap end of the cable tie into the head aperture can be a tedious assembly step. The aperture is often small and requires accurate insertion of the end of the strap to engage the pawl with the teeth of the strap. During mass assembly, the time required to perform the assembly step becomes more important, for example, when attaching labels to products, wrapping rodent barriers around fruit trees, or attaching fencing to wires. Some of these examples require the user to thread the strap portion into the head aperture while holding the bundle of objects together, kneeling close to the ground, or while stretching to reach above head-level.

Therefore, a need exists for an improved tie strap that allows reuse and increases ease of assembly. Embodiments of the present disclosure are directed to fulfilling these and other needs.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present disclosure, a removable cable tie is provided. The removable cable tie generally includes an elongate web; a first tooth and a second tooth projecting bilaterally from the web; a retaining portion positioned at a first end of the web comprising a first leg and a second leg spaced apart to form a c-shaped pocket configured to receive the web, the first leg having a first web retention protrusion at a distal end and projecting laterally toward the second leg, the second leg having a second web retention protrusion at a distal end and projecting laterally toward the first web retention protrusion; and a gap between the first and second web retention protrusions forming an opening of the pocket therebetween, wherein the opening may be smaller than the width of the web such that the retention portion is configured to allow sliding movement of the web through the pocket in a first direction, and wherein the first and second teeth may be configured to engage the retaining portion and prevent the sliding movement of the web in a second direction opposite the first direction.

In accordance with another embodiment of the present disclosure, a cable tie is provided. The cable tie generally includes an elongate strap body defining an axis; a tooth projecting laterally from the strap body radially from the axis; and a c-shaped pocket positioned at a first end of the strap body and sized to receive the strap body, the pocket formed by a first leg and a second leg extending from the strap body in a spaced apart position, the first leg having a first body retention protrusion at a distal end and projecting laterally toward the second leg, the second leg having a second body retention protrusion at a distal end and projecting laterally toward the first web retention protrusion, wherein the pocket may be configured to releasably secure the strap body in directions radial to the axis and allow sliding movement of the strap body through the pocket along the axis in a first direction, and wherein the tooth may be configured to engage one of the first and second legs to prevent the sliding movement of the strap body in a second direction opposite the first direction.

In accordance with any of the embodiments disclosed herein, the cable tie may further comprise first and second tooth retention protrusions projecting opposingly into the pocket, the first and second tooth retention protrusions configured to engage the first and second teeth to prevent the sliding movement of the web in the second direction.

In accordance with any of the embodiments disclosed herein, a portion of the web positioned adjacent the second end may have a reduced width.

In accordance with any of the embodiments disclosed herein, the opening of the pocket may be larger than the width of the portion of the web adjacent the second end.

In accordance with any of the embodiments disclosed herein, the web may have a thickness smaller than the opening of the pocket such that twisting the web allows removal of the web from the pocket in a direction toward the opening.

In accordance with any of the embodiments disclosed herein, the first web retention protrusion may have a first ramp positioned adjacent to the web in an inserted position, the first ramp configured to facilitate removal of the web from the pocket upon twisting the web toward the first ramp.

In accordance with any of the embodiments disclosed herein, the second web retention protrusion may have a second ramp positioned adjacent to the web in an inserted position, the second ramp configured to facilitate removal of the web from the pocket upon twisting the web toward the second ramp.

In accordance with any of the embodiments disclosed herein, the web may further comprise an end portion positioned at the second end, the end portion selected from the group consisting of a handle, a fastener, a clip, a fitting, a threaded portion, a notched portion, a loop, and combinations thereof.

In accordance with any of the embodiments disclosed herein, the web may further comprise a third tooth and a fourth tooth projecting bilaterally from the web adjacent to the first and second teeth, the third and fourth teeth configured to engage the first and second tooth retention portions to prevent the sliding movement of the web in the second direction.

In accordance with any of the embodiments disclosed herein, the cable tie may comprise a material selected from the group consisting of nylon, polypropylene, polyethylene, polyvinyl chloride (PVC), polyolefin, polyurethane, chloroprene, polychloroprene, ethylene tetrafluoroethylene (ETFE), polyoxymethylene (POM), polyamide, polyester, polyaryletherketone (PAEK), polyether ether ketones (PEEK), ethylene chlorotrifluoroethylene (ECTFE), polyvinylidene fluoride, polyvinylidene difluoride (PVDF), thermoplastic elastomer, thermoset elastomer, rubber, crosslinked foam, thermoplastic foam, metal, composite, and combinations thereof.

DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein.

DETAILED DESCRIPTION

The detailed description set forth below in connection with the appended drawings, where like numerals reference like elements, are intended as a description of various embodiments of the present disclosure and are not intended to represent the only embodiments. Each embodiment described in this disclosure is provided merely as an example or illustration and should not be construed as precluding other embodiments. The illustrative examples provided herein are not intended to be exhaustive or to limit the disclosure to the precise forms disclosed.

In the following description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to directions, such as "forward," "rearward," "front," "rear," "upward," "downward," "top," "bottom," "right hand," "left hand," "lateral," "medial," "distal," "proximal," "in," "out," "extended," etc. These references, and other similar references in the present application, are only to assist in helping describe and to understand the particular embodiment and are not intended to limit the present disclosure to these directions or locations.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The term "about," "approximately," etc., means plus or minus 5% of the stated value.

The following description provides several examples that relate generally to cable tie fasteners having a retaining portion on one end which secures to an intermediate location on a web to form a loop having an adjustable diameter. Embodiments of the cable tie disclosed herein are suitable to form a loop around various objects to fasten or bundle the objects together, such as into a grouping of wires, cables, hoses, or the like. However, other embodiments of the cable tie are suitable for use in any installation where fastening with an adjustable loop is desired. Embodiments disclosed herein use symmetry, where applicable, for clarity and convenience; however, the use of symmetry (e.g., left to right, front and rear, and/or top and bottom, etc.) should not be construed as limiting the scope of the disclosure to symmetric parts, as the present disclosure also contemplates "handed" parts in locations where symmetric parts are illustrated and described.

A reusable cable tie generally includes a retaining portion that engages the web on one or more surfaces without using the fully-enclosed aperture of conventional cable ties, allowing improved ease of assembly, removal, and adjustment of the cable tie loop. Embodiments of the present disclosure permit the cable tie to be released and reused without actuating a pawl release mechanism found in conventional reusable cable ties. In some embodiments, the cable tie is configured to accommodate a range of loop diameter adjustment by including a plurality of teeth along the web, where each tooth, or opposing pair of teeth, provide a securement location on the web for the retaining portion. In this regard, the adjustment of the loop diameter results in discrete intervals related to the spacing of the plurality of teeth. However, in other embodiments, the adjustment of the loop diameter may be continuous by using any suitable securement means of the web to the retaining portion, such as friction surfaces, elastic or plastic deformation, pinching force, and any combination thereof.

In some configurations, the cable tie is used to fasten or bundle a group of objects that are not circular in shape. In these instances, it is desirable for the cable tie to be comprised of a material capable of conforming to the shape of the group of objects for more effective fastening. Cable ties of the present disclosure are generally comprised of a polymeric or elastomeric material to allow the cable tie to conform to the shape of the group of objects. In some embodiments, the cable tie is manufactured from any suitable material to provide the desired clamping characteristics on the group of objects, such as nylon, polypropylene, polyethylene, polyvinyl chloride (PVC), polyolefin, polyurethane, chloroprene, polychloroprene, ethylene tetrafluoroethylene (ETFE), polyoxymethylene (POM), polyamide, polyester, polyaryletherketone (PAEK), polyether ether ketones (PEEK), ethylene chlorotrifluoroethylene (ECTFE), polyvinylidene fluoride, polyvinylidene difluoride (PVDF), thermoplastic elastomer, thermoset elastomer, rubber, cross-linked foam, thermoplastic foam, etc. In other configurations, the material of the cable tie is specified for certain properties, such as strength, toughness, elasticity, durability, corrosion resistance, thermal stability, chemical stability, color stability, UV degradation resistance, appearance, surface finish, etc. In this regard, the material of the cable tie may include metal, composite, laminate, plastic, polymer, and any combination thereof.

Referring to FIGS. 1-6, an exemplary embodiment of a cable tie 100 suitable for use as an adjustable loop fastener is depicted. The cable tie 100 is shown with one example of a retaining portion, a retaining head 130, positioned at a first end of the cable tie 100 and configured to partially surround an elongate web 110 of the cable tie 100. In the illustrated embodiment, the cable tie 100 includes a necked-down portion 120 (reduced in cross-sectional area) and a handle 122 at a second end that facilitates gripping of the cable tie 100. As will be explained in greater detail below, the necked-down portion 120 and the handle 122 facilitate assembly and installation of the loop of the cable tie 100.

Figure 1:
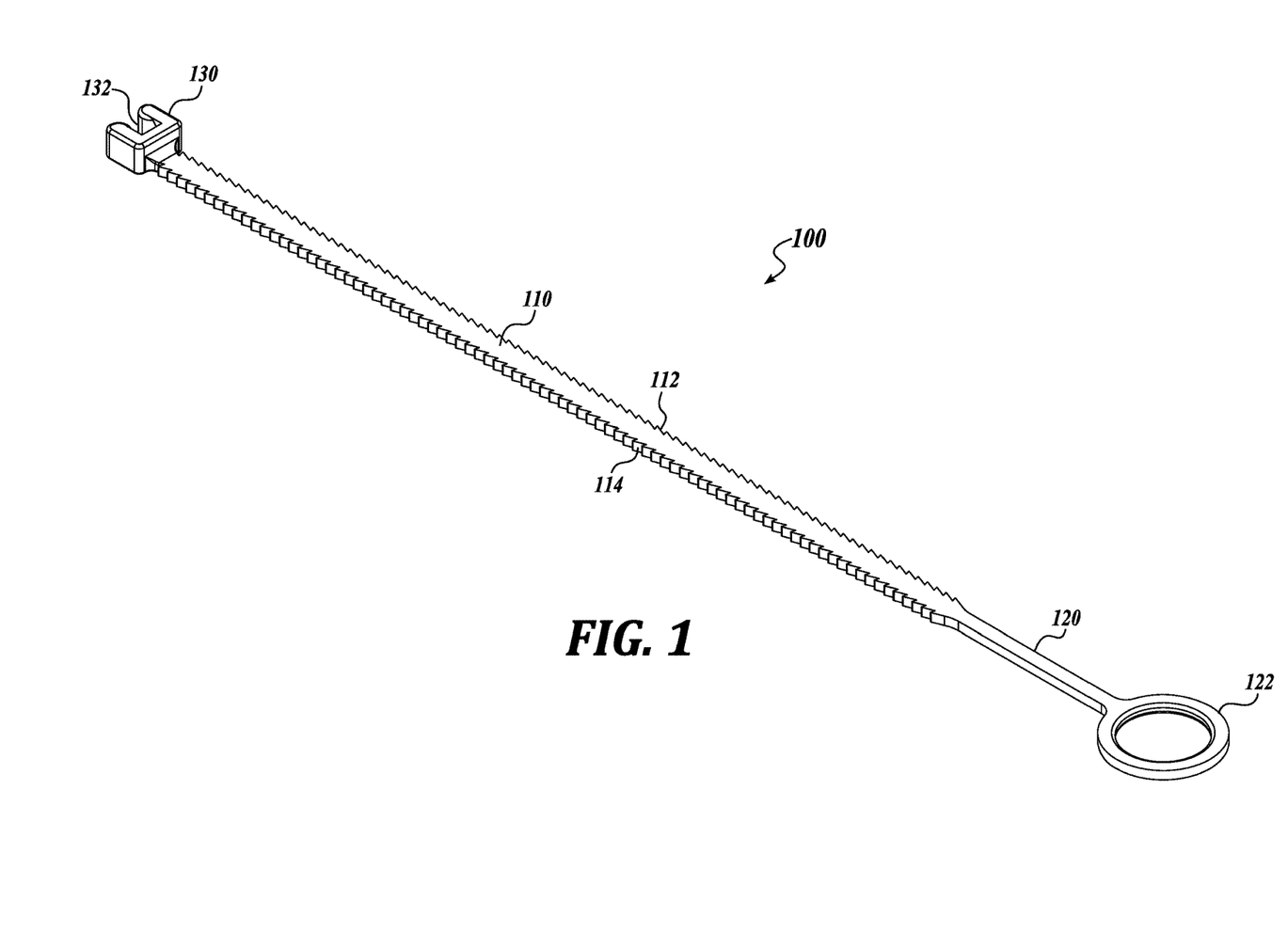
FIG. 1 is a front left top isometric view of one representative embodiment of a cable tie in accordance with an aspect of the present disclosure.
Figure 2:
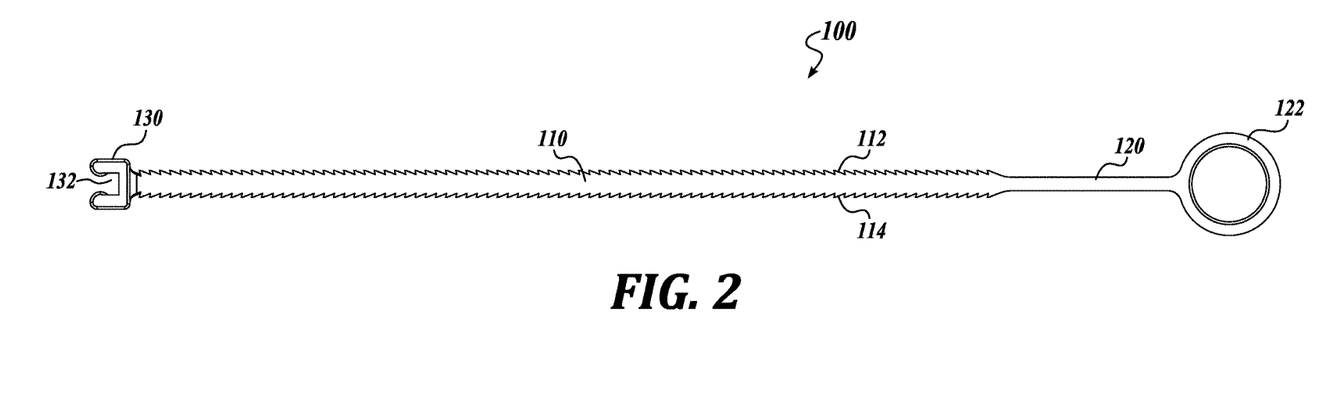
FIG. 2 is a top elevation view of the cable tie of FIG. 1.
Figure 3:
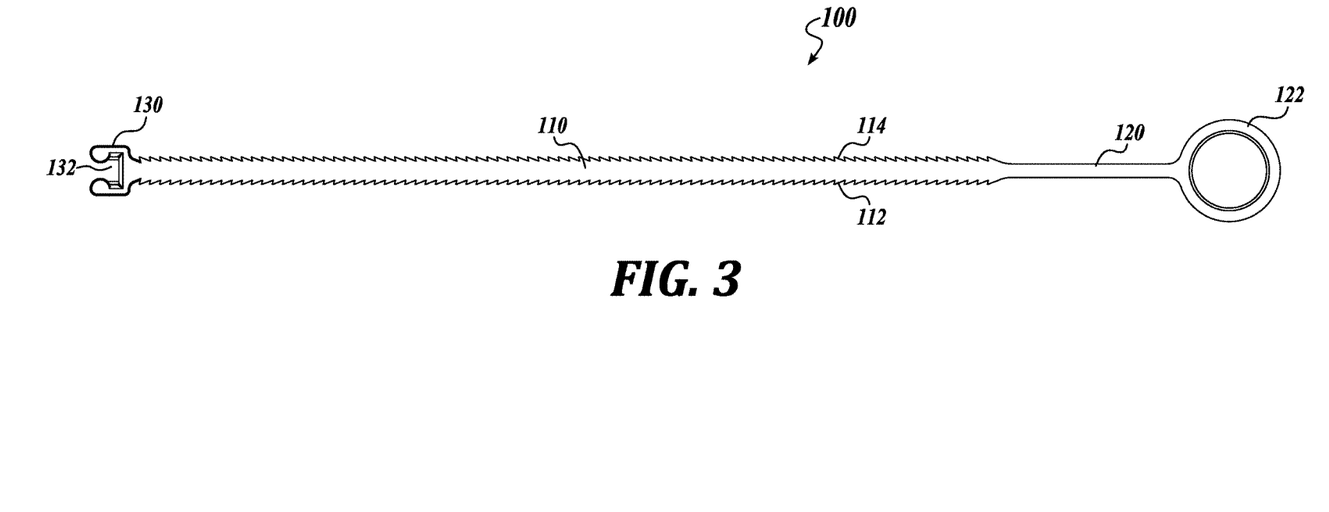
FIG. 3 is a bottom elevation view of the cable tie of FIG. 1.
Figure 4:
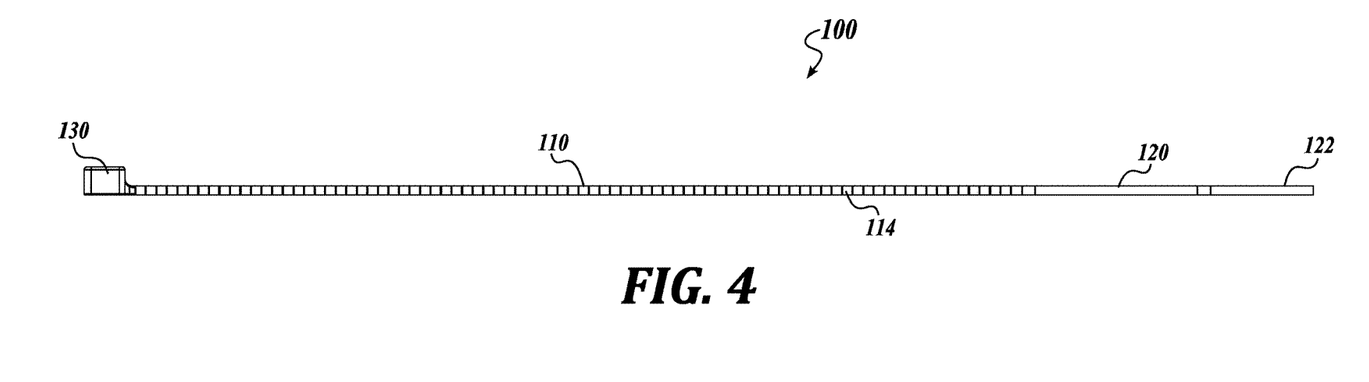
FIG. 4 is a left elevation view of the cable tie of FIG. 1.

Although the illustrated embodiments show the handle 122 at the second end, in other embodiments any suitable end configuration is within the scope of the present disclosure. In some embodiments, the second end of the cable tie 100 is configured for attachment to another object, through a fastener, clip, fitting, threaded portion, loop, or other suitable attachment configuration. In other embodiments, the second end includes a retaining feature (not shown) that may removably couple the second and to the web 110 upon fastening of the cable tie 100. In this regard, the second end of the cable tie 100 would be stowed during use. In further embodiments, the second end includes a combination of any of the above features.

Configurations of the elongate web 110 will now be explained in greater detail. Although the elongate web 110 is shown in the general rectangular shape of a flat strip, in other embodiments, the elongate web 110 is any suitable shape, including circular, triangular, polygonal, and the like.

In some embodiments, the elongate web 110 includes a plurality of teeth positioned along the length of the elongate web 110. The teeth may be positioned on a single surface of the elongate web 110, or on multiple surfaces, as shown in FIGS. 1-9. In the illustrated embodiment, a first tooth 112 and a second tooth 114 project bilaterally from the elongate web 110 such that the first tooth 112 is positioned opposingly away from the second tooth 114 in a mirrored configuration about a central axis of the elongate web 110. As shown, instances of the first and second teeth 112 and 114 may be repeated along the length of the elongate web 110 to provide adjustment of the loop of the cable tie 100 during use, as will be explained in greater detail below. In the FIGURES, the first and second teeth 112 and 114 are generally a triangular shape in a top view, as in FIG. 2; however, in other embodiments, the teeth are suitably any shape configured to engage the retaining head 130 to secure the loop of the cable tie 100.

Figure 5:
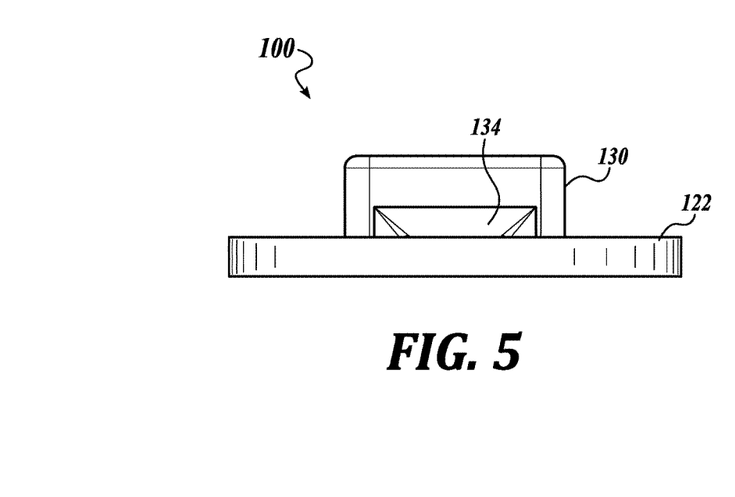
FIG. 5 is a front elevation view of the cable tie of FIG. 1.
Figure 6:
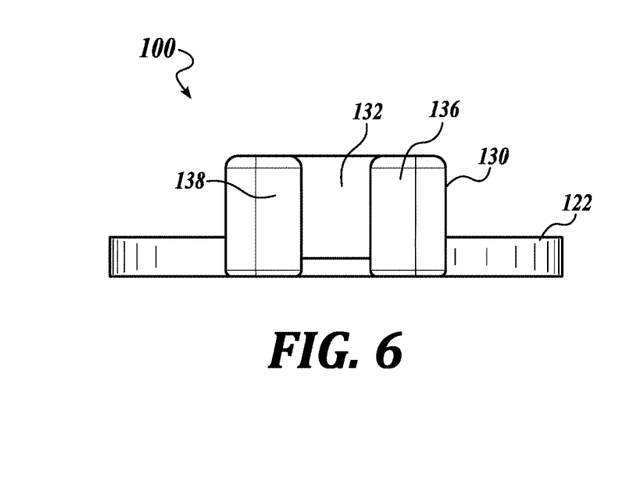
FIG. 6 is a rear elevation view of the cable tie of FIG. 1.
Figure 7:
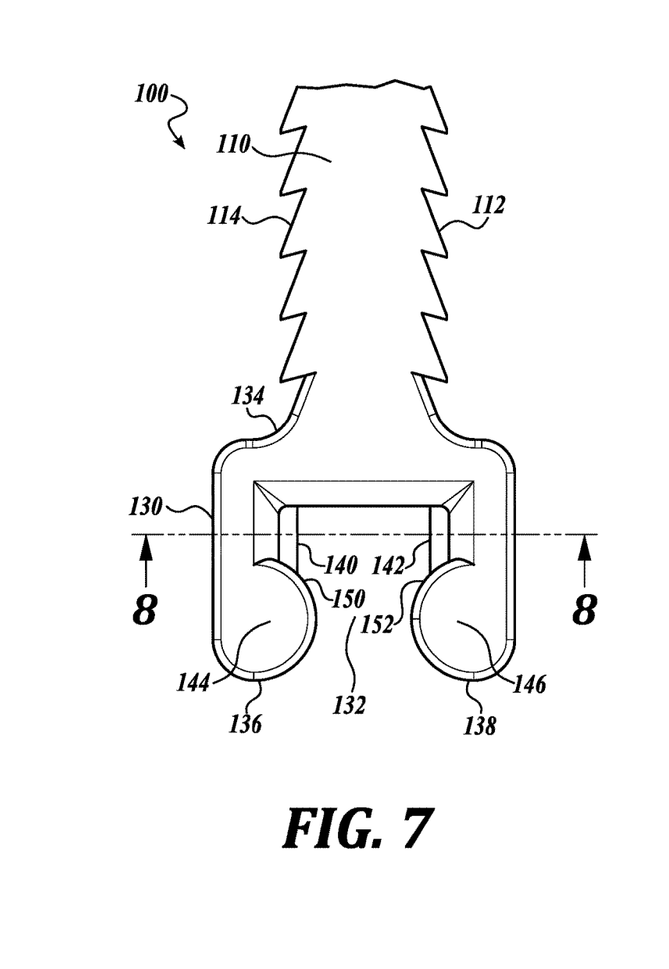
FIG. 7 is a partial bottom view of a retaining head of the cable tie of FIG. 1.

Turning to FIGS. 5-7, embodiments of the retaining head 130 will now be explained in greater detail. The retaining head 130 is positioned at the first end of the cable tie 100, and includes a first leg 136 and a second leg 138 in a spaced apart configuration to form a c-shaped pocket 132. The pocket 132 of the retaining head 130 is configured to receive and partially surround the elongate web 110 of the cable tie 100. In some embodiments, the retaining head 130 may include a stress relief feature 134 (shown most clearly in FIG. 7), such as a fillet or chamfer, to prevent failure of the cable tie 100 at the transition from the elongate web 110 to the retaining head 130.

The orientation of the head 130 shown in FIGS. 1-6 is such that the pocket 132 is aligned with an axis (not shown) along the length of the elongate web 110 and opens away from the elongate web 110. However, in other embodiments, the pocket 132 of the retaining head 130 is positioned in any suitable orientation with respect to the elongate web 110. In some embodiments, the pocket 132 may be positioned perpendicular to the elongate web 110, for example, to minimize a gap between the cable tie 100 and the objects to be fastened, or to introduce a twist in the elongate web 110 upon assembly of the loop of the cable tie 100. In other embodiments, the retaining head 130 may be rotatably pinned to the elongate web 110 such that the pocket 132 may be oriented in a variety of positions without damaging the cable tie 100.

As shown in FIG. 7, the first and second legs 136 and 138 include various retention features to secure the elongate web 110 within the pocket 132 of the retaining head 130. The first and second legs 136 and 138 include a first tooth retention protrusion 140 and a second tooth retention protrusion 142. As shown most clearly in FIG. 8, the first and second tooth retention protrusions 140 and 142 are positioned and shaped to interface the first and second teeth 112 and 114 of the elongate web 110 such that the elongate web 110 is only allowed to slide in one direction within the pocket 132 along the axis of the elongate web 110. In the configuration shown in FIG. 8, once the first and second teeth 112 and 114 are slid past the first and second tooth retention protrusions 140 and 142, the elongate web 110 cannot slide in the opposite direction until the elongate web 110 is released from the pocket 132. Although the illustrated embodiment shows a single pair of opposing first and second tooth retention protrusions 140 and 142, in other embodiments, any number of tooth retention protrusions is suitable for use with the present disclosure. In these embodiments, the retention head 130 may include a plurality of tooth retention protrusions to engage any number of teeth on the elongate web 110, for example, if greater retention strength is desired.

The first and second legs 136 and 138 include a first web retention protrusion 144 and a second web retention protrusion 146 extending laterally into the pocket 132. The first and second web retention protrusions 144 and 146 extend into the pocket 132 at a distance suitable to retain the elongate web 110 within the pocket 132 for tightening of the loop of the cable tie 100. In this regard, first and second web retention protrusions 144 and 146 are spaced apart a suitable distance to form a gap therebetween. In some embodiments, the gap is large enough to allow the necked-down portion 120 to pass into the pocket, but smaller than the tip-to-tip distance between the first and second teeth 112 and 114 such that the first and second web retention protrusions 144 and 146 prevent exit of the elongate web 110 from the pocket 132 once the first and second teeth 112 and 114 have engaged the first and second tooth retention protrusions 140 and 142, as will be explained in greater detail below.

Figure 8:
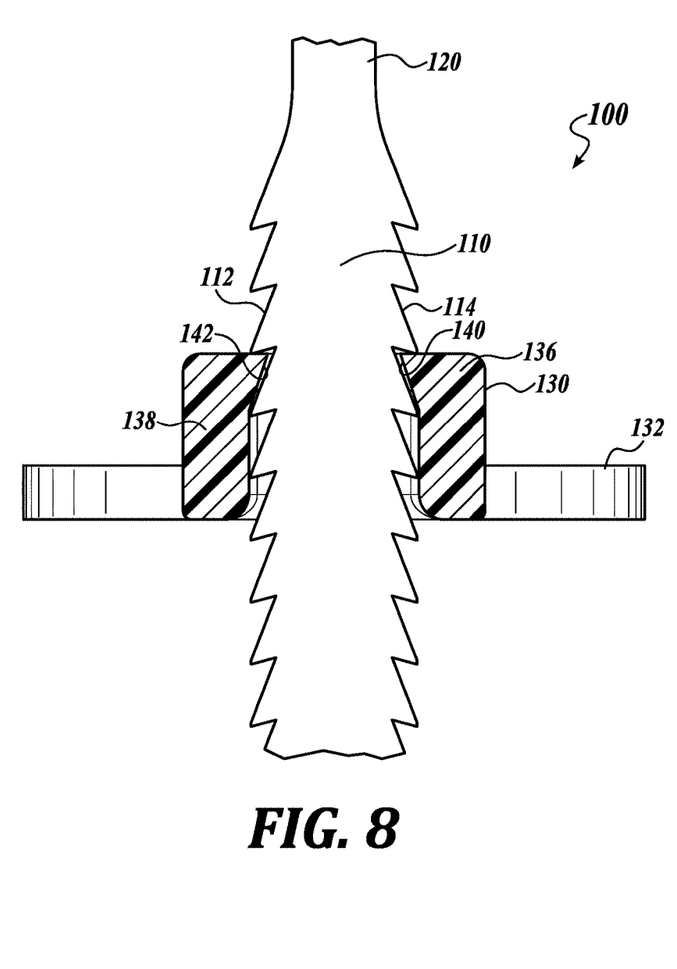
FIG. 8 is a partial rear cross-sectional view of the retaining head of the cable tie of FIG. 1, additionally showing an elongate web engaged with a pocket.

Turning to FIG. 8, a cross-sectional view of one example of an assembled configuration is shown. The cross-section is shown at an intermediate location along the pocket 132 such that the first and second web retention protrusions 144 and 146 are hidden. The elongate web 110 is shown inserted into the pocket 132 with the first and second teeth 112 and 114 engaged with the first and second tooth retention protrusions 140 and 142. In this embodiment, as the elongate web 110 is slid in the direction that tightens the diameter of the loop of the cable tie 100, the first and second tooth retention protrusions 140 and 142 disengage from the first and second teeth 112 and 114 and ratchet to another set of opposing teeth along the elongate web 110. The transition to the next set of teeth of the elongate web 110 is facilitated by deformation of one or more of the first and second tooth retention protrusions 140 and 142 and the first and second teeth 112 and 114. In this regard, the first and second legs 136 and 138 may temporarily spread to allow bypass of the first and second teeth 112 and 114 as the loop of the cable tie 100 is tightened.

Figure 9:
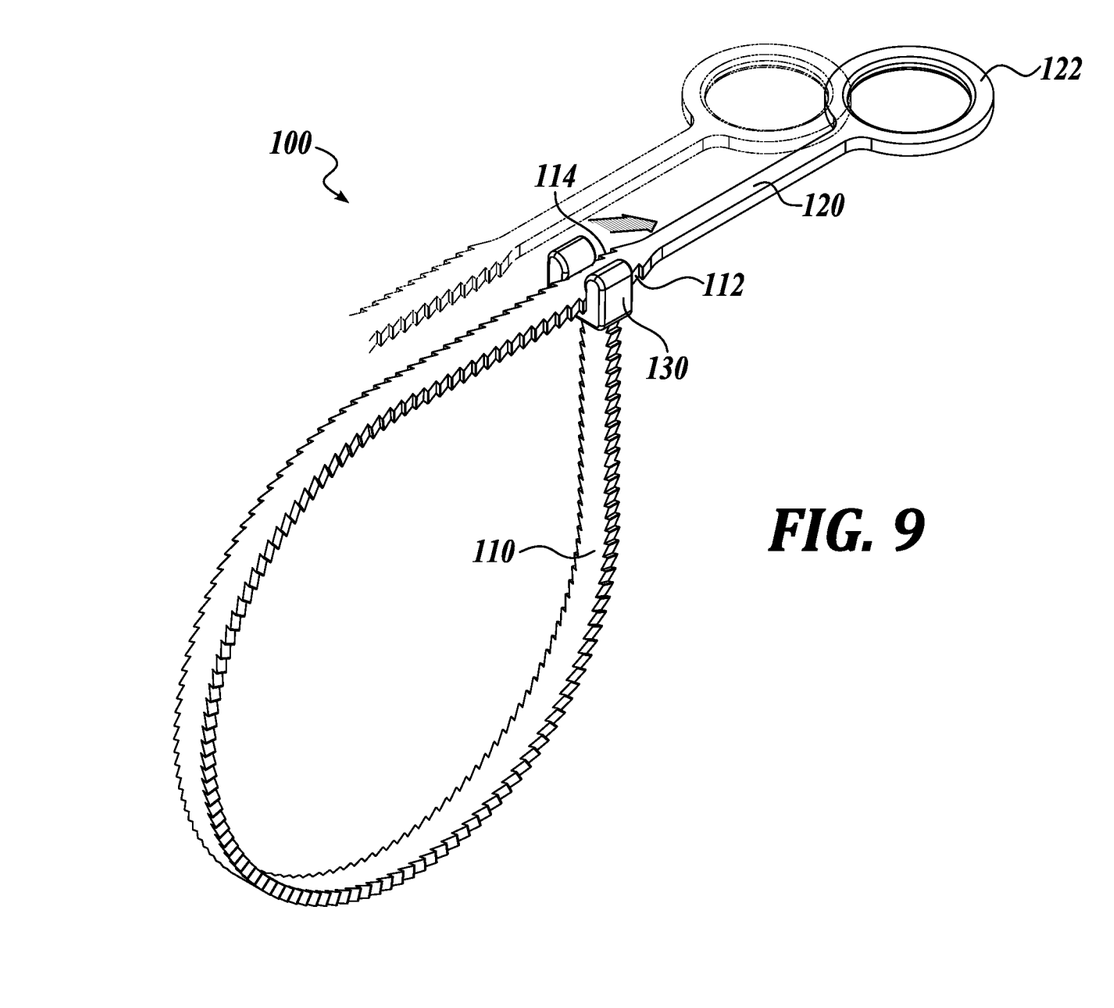
FIG. 9 is a perspective view of the cable tie of FIG. 1, showing an example of assembly of the cable tie.

An example of assembly of the elongate web 110 to the retaining head 130 will now be explained in greater detail. Turning to FIG. 9, the cable tie 100 is shown forming a loop to fasten around group of objects. As shown by the arrow, the necked-down portion 120 is positioned above and inserted into the pocket 132 through the gap between the first and second web retention protrusions 144 and 146. Next, the elongate web 110 is pulled axially through the pocket 132 by the handle 122 such that at least the first pair of first and second teeth 112 and 114 exit the pocket 132 to engage the first and second tooth retention protrusions 140 and 142. At this point, the loop of the cable tie 100 is secured and will not loosen without disassembly of the cable tie 100, as will be explained in detail below. To reduce the diameter of the loop and tighten the cable tie 100, the elongate web 110 is further pulled axially through the pocket 132 by the handle 122 to release and engage pairs of teeth 112 and 114 along the elongate web 110 until the desired loop diameter and/or fastener tightness is reached.

An example of disassembly of the elongate web 110 from the retaining head 130 will now be explained in greater detail. Returning initially to FIG. 7, in some embodiments, the first and second web retention protrusions 144 and 146 include first and second ramps 150 and 152, respectively. In some embodiments, the first and second ramps 150 and 152 are generally an arcuate shape. However, in other embodiments, the first and second ramps 150 and 152 are any suitable shape to assist in the release of the elongate web 110 from the pocket 132, which will now be explained in greater detail.

Figure 10A:
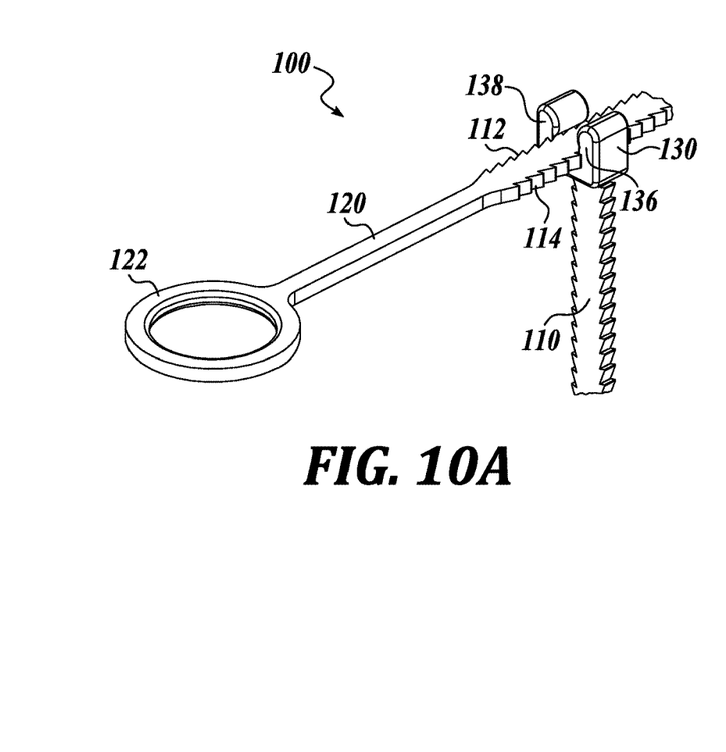
FIG. 10A is a perspective view of the cable tie of FIG. 1, showing an example of an assembled cable tie.
Figure 10B:
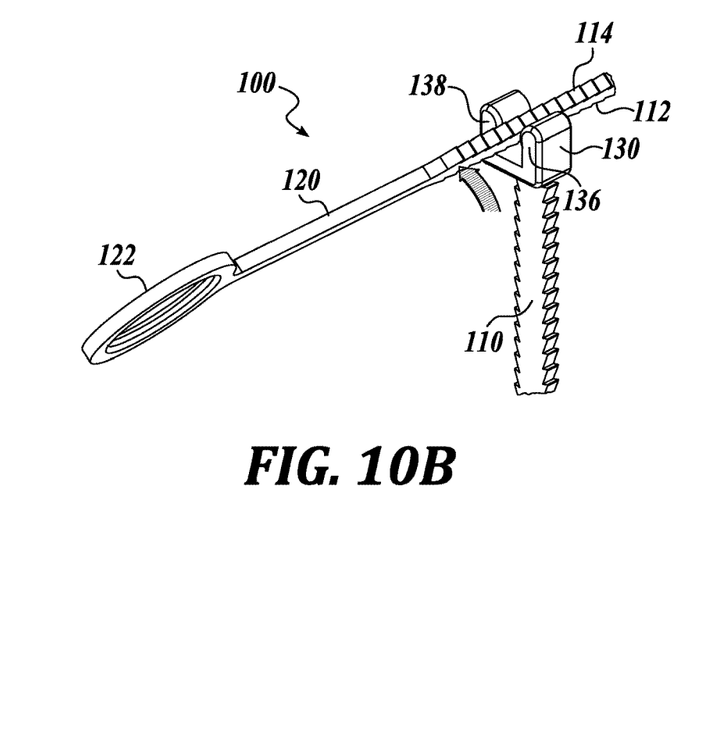
FIG. 10B is a perspective view of the cable tie of FIG. 1, showing an example of disassembly of the cable tie.
Figure 11:
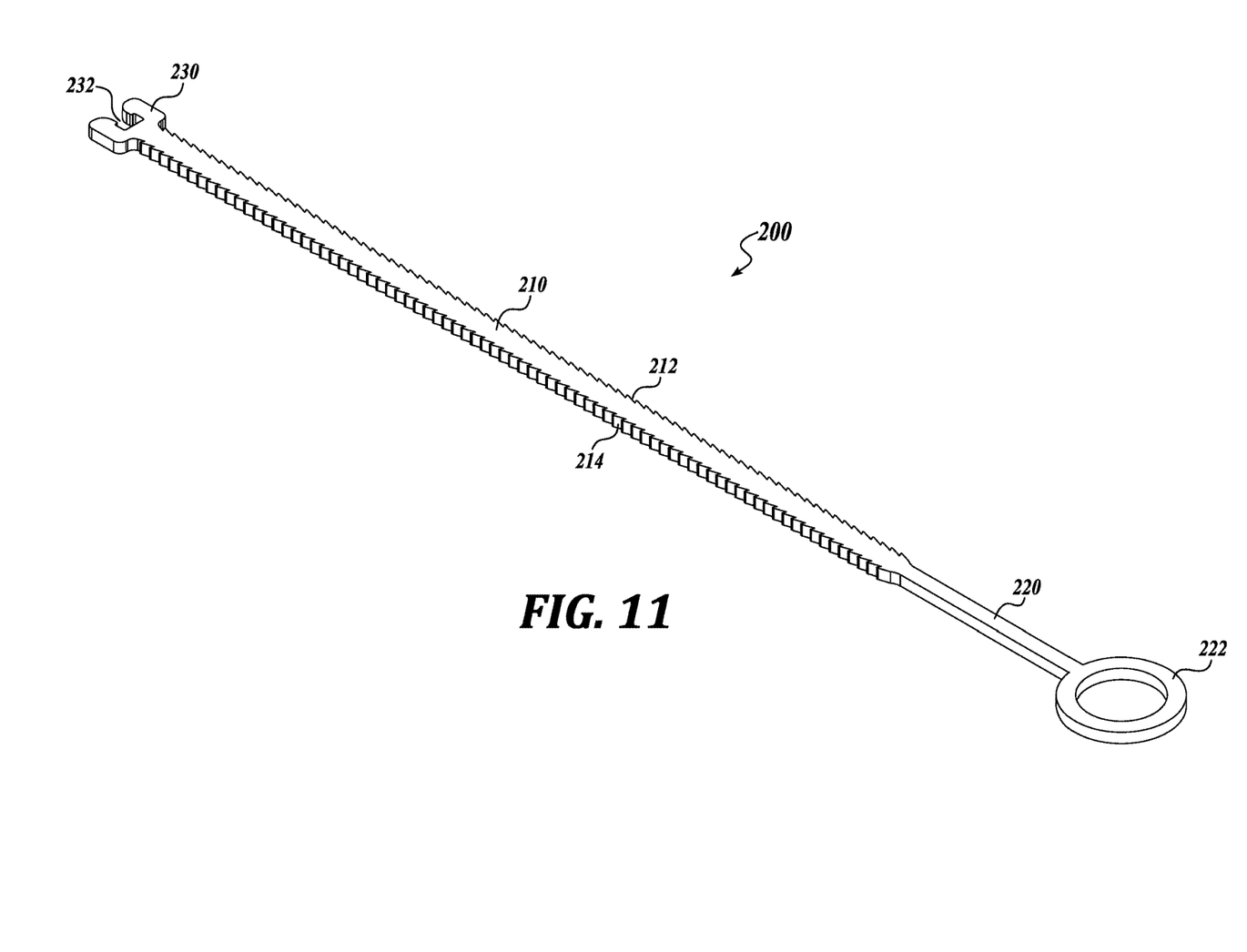
FIG. 11 is a front left top isometric view of another representative embodiment of a cable tie in accordance with an aspect of the present disclosure.
Figure 12:
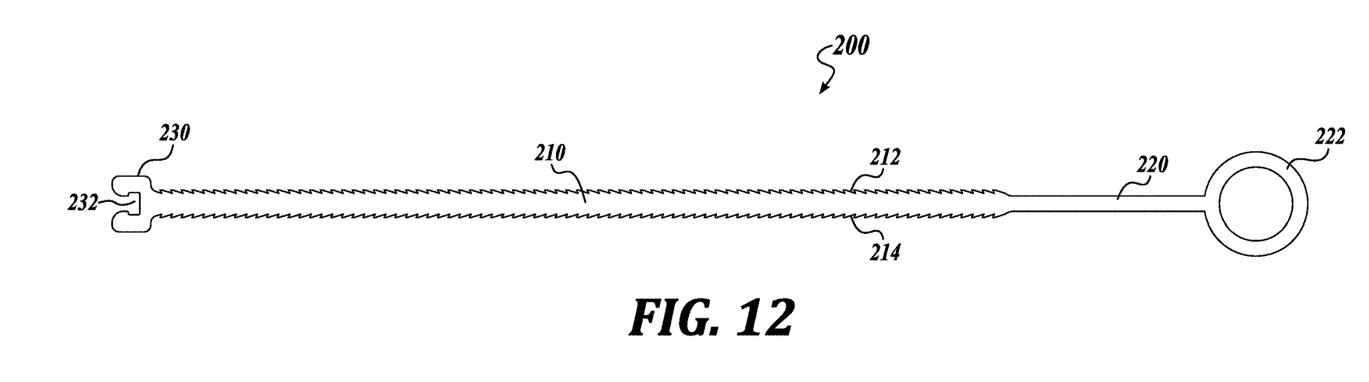
FIG. 12 is a top elevation view of the cable tie of FIG. 11.
Figure 13:
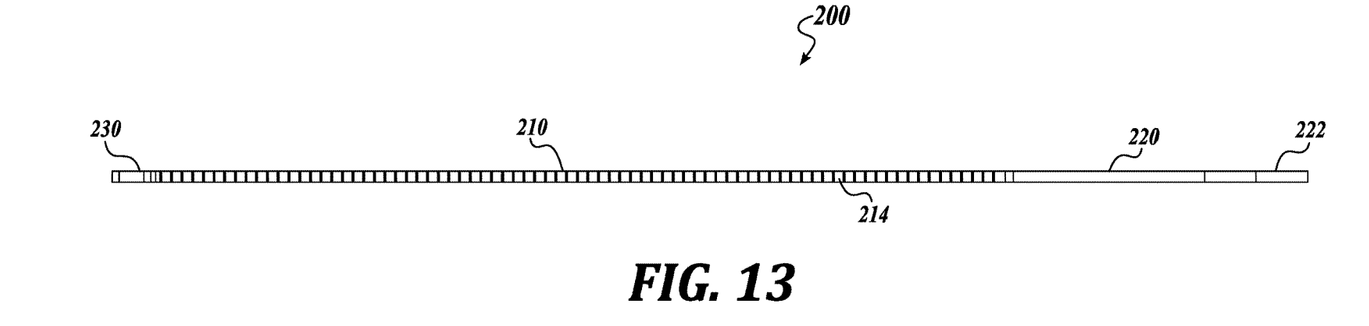
FIG. 13 is a left elevation view of the cable tie of FIG. 11.

Turning now to FIGS. 10A and 10B, an example of the assembled cable tie 100 and disassembly of the cable tie 100 is shown. In some embodiments, the elongate web 110 is released from the pocket 132 of the retaining head 130 by applying a torque to the elongate web 110 about the axis positioned along the length of the elongate web 110. In embodiments of the cable tie 100, the torque can be applied in either direction, clockwise or counterclockwise. In the illustrated example, torque is applied to the elongate web 110 in a counterclockwise direction about the axis when facing the handle 122 (see FIG. 10B). As a result of the torque, one or both of the first and second legs 136 and 138 may temporarily spread to allow bypass of one or more of the teeth along the elongate web 110, as shown. After the elongate web 110 has twisted past the first leg 136, the elongate web 110 is released from the pocket 132 and the cable tie 100 is disassembled.

The foregoing description relates to disassembly of the cable tie 100 by applying a counterclockwise torque to the elongate web 110; however, in other embodiments, the torque may be applied in a clockwise direction to disassemble the cable tie 100. In further embodiments, disassembly of the cable tie 100 may be suitably accomplished by pulling the elongate web 110 in a direction toward the opening of the pocket 132. In this regard, the first and second legs 136 and 138 may deflect away, spreading the pocket 132 to allow release of the elongate web 110.

Turning now to FIGS. 11-15, a representative embodiment of a cable tie 200 is shown. The cable tie 200 is similar to the previously described cable tie 100, and the following description will proceed with the understanding that elements of the cable tie 200 designated with a 200-series reference numeral (2XX) correspond to similar elements from the cable tie 100 designated with a 100-series reference numeral (1XX). In addition, for the sake of brevity, not all features of the cable tie 200 will be described, and features not described are the same or similar to the corresponding features of the cable tie 100.

Figure 14:
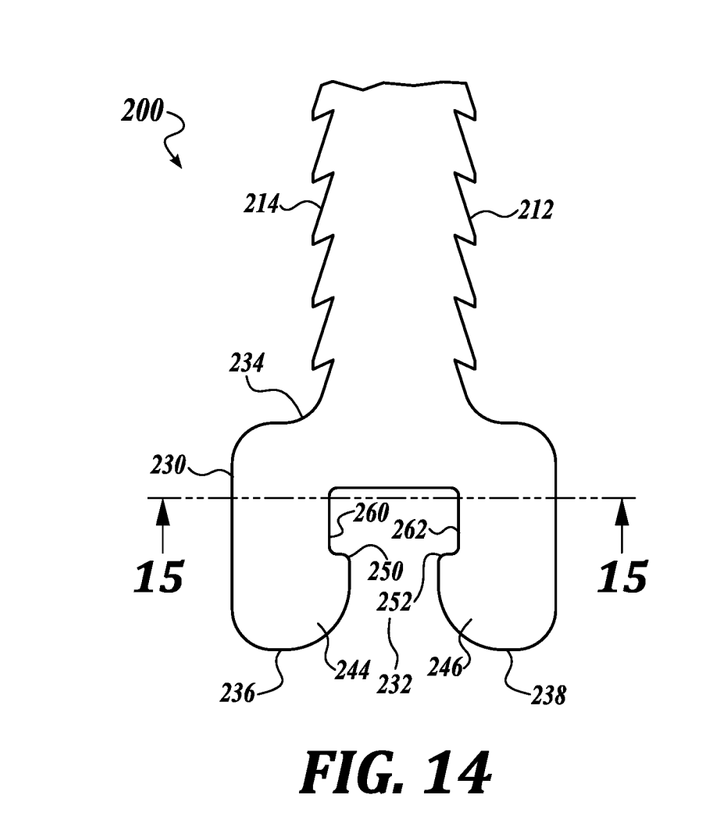
FIG. 14 is a partial bottom view of a retaining head of the cable tie of FIG. 11.

Referring to FIG. 14, a retaining head 230 is shown having a first leg 236 and a second leg 238 forming a pocket 232 therebetween. The first and second legs 236 and 238 include various retention features to secure an elongate web 210 within the pocket 232 of the retaining head 230. In contrast to the first and second tooth retention protrusions 140 and 142 of the cable tie 100, the retaining head 230 of the cable tie 200 includes a first retention surface 260 and a second retention surface 262 positioned to allow a first tooth 212 and a second tooth 214 to pass through the pocket 232 to interface a retention face 264 of the retaining head 230. The interface of the first and second teeth 212 and 214 with the retention face 264 is such that the elongate web 210 is only allowed to slide in one direction within the pocket 232 along an axis along the length of the elongate web 210.

Figure 15:
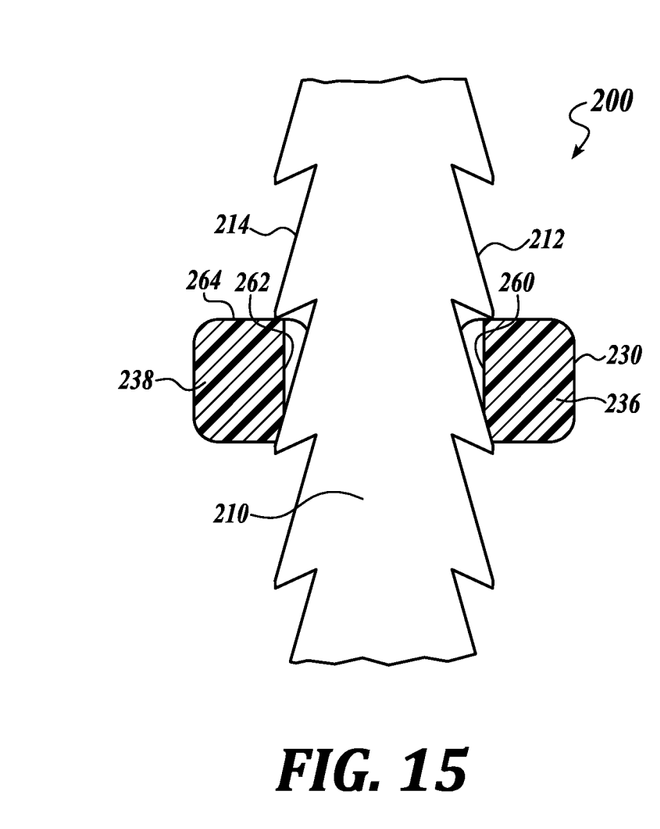
FIG. 15 is a partial rear cross-sectional view of the retaining head of the cable tie of FIG. 11, additionally showing an elongate web engaged with a pocket.

In the configuration shown in FIG. 15, once the first and second teeth 212 and 214 are slid past the first and second retention surfaces 260 and 262, the elongate web 210 cannot slide in the opposite direction until the elongate web 210 is released from the pocket 232. In FIG. 15, a cross-sectional view of one example of an assembled configuration is shown. The cross-section is shown at an intermediate location along the pocket 232 such that first and second web retention protrusions 244 and 246 are hidden. The elongate web 210 is shown inserted into the pocket 232 with the first and second teeth 212 and 214 engaged with the retention face 264. The transition to the next set of teeth of the elongate web 210 as the loop is tightened is facilitated by deformation of one or more of the first and second legs 236 and 238 and the first and second teeth 212 and 214. In this regard, the first and second legs 236 and 238 may temporarily spread to allow bypass of the first and second teeth 212 and 214 as the loop of the cable tie 200 is tightened.

Disassembly of the cable tie 200 is similar to that of the cable tie 100 as described above. The first and second legs 236 and 238 include first and second ramps 250 and 252, illustrating another embodiment of the shape of the ramps, which are also suitable for use with the cable tie 100. It will be appreciated that variations between the cable tie 200 and the cable tie 100 may exist due to different spatial constraints, retaining head configurations, etc. and such variations should be considered within the scope of the present disclosure.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A removable cable tie, comprising:
    an elongate web having a first end and a second end;
    a first tooth and a second tooth projecting bilaterally from the web;
    a retaining portion positioned at the first end of the web comprising a first leg and a second leg spaced apart to form a C-shaped pocket configured to receive the web, the first leg having a first web retention protrusion at a distal end and projecting laterally toward the second leg, the second leg having a second web retention protrusion at a distal end and projecting laterally toward the first web retention protrusion; and
    a gap between the first and second web retention protrusions forming an opening of the pocket therebetween,
    wherein the opening is smaller than the width of the web such that the retention portion is configured to allow sliding movement of the web through the pocket in a first direction, and wherein the first and second teeth are configured to engage the retaining portion and prevent the sliding movement of the web in a second direction opposite the first direction, and
    wherein the web has a thickness smaller than the opening of the pocket such that twisting the web allows removal of the web from the pocket in a direction toward the opening.

2. The removable cable tie of claim 1, further comprising first and second tooth retention protrusions projecting opposingly into the pocket, the first and second tooth retention protrusions configured to engage the first and second teeth to prevent the sliding movement of the web in the second direction.

3. The removable cable tie of claim 1, wherein a portion of the web positioned adjacent the second end has a reduced width.

4. The removable cable tie of claim 3, wherein the opening of the pocket is larger than the width of the portion of the web adjacent the second end.

5. The removable cable tie of claim 1, wherein the first web retention protrusion has a first ramp positioned adjacent to the web in an inserted position, the first ramp configured to facilitate removal of the web from the pocket upon twisting the web toward the first ramp.

6. The removable cable tie of claim 5, wherein the second web retention protrusion has a second ramp positioned adjacent to the web in an inserted position, the second ramp configured to facilitate removal of the web from the pocket upon twisting the web toward the second ramp.

7. The removable cable tie of claim 1, further comprising an end portion positioned at the second end, the end portion selected from the group consisting of a handle, a fastener, a clip, a fitting, a threaded portion, a notched portion, a loop, and combinations thereof.

8. The removable cable tie of claim 1, wherein the web further comprises a third tooth and a fourth tooth projecting bilaterally from the web adjacent to the first and second teeth, the third and fourth teeth configured to engage the first and second tooth retention portions to prevent the sliding movement of the web in the second direction.

9. The removable cable tie of claim 1, comprising a material selected from the group consisting of nylon, polypropylene, polyethylene, polyvinyl chloride (PVC), polyolefin, polyurethane, chloroprene, polychloroprene, ethylene tetrafluoroethylene (ETFE), polyoxymethylene (POM), polyamide, polyester, polyaryletherketone (PAEK), polyether ether ketones (PEEK), ethylene chlorotrifluoroethylene (ECTFE), polyvinylidene fluoride, polyvinylidene difluoride (PVDF), thermoplastic elastomer, thermoset elastomer, rubber, cross-linked foam, thermoplastic foam, metal, composite, and combinations thereof.

10. A cable tie, comprising:
    an elongate strap body defining an axis and having a first end and a second end, a portion of the strap body positioned adjacent the second end having a reduced cross section;
    a tooth projecting laterally from the strap body radially from the axis; and
    a C-shaped pocket positioned at the first end of the strap body and sized to receive the strap body, the pocket formed by a first leg and a second leg extending from the strap body in a spaced apart position, the first leg having a first body retention protrusion at a distal end and projecting laterally toward the second leg, the second leg having a second body retention protrusion at a distal end and projecting laterally toward the first web retention protrusion, the spacing of the first and second body retention protrusions forming an opening that is larger than the width or height of the portion of the strap body having a reduced cross section,
    wherein the pocket is configured to releasably secure the strap body in directions radial to the axis and allow sliding movement of the strap body through the pocket along the axis in a first direction, and wherein the tooth is configured to engage one of the first and second legs to prevent the sliding movement of the strap body in a second direction opposite the first direction, and
    wherein the strap body has a width or height smaller than the opening such that twisting the strap body allows removal of the strap body from the pocket in a direction toward the opening.

11. The cable tie of claim 10, further comprising a tooth retention protrusion projecting into the pocket and configured to engage the tooth to prevent the sliding movement of the strap body in the second direction.

12. The cable tie of claim 10, wherein the first body retention protrusion has a first ramp positioned adjacent to the strap body in an inserted position, the first ramp configured to facilitate removal of the strap body from the pocket upon twisting the body toward the first ramp.

13. The cable tie of claim 12, wherein the second body retention protrusion has a second ramp positioned adjacent to the strap body in an inserted position, the second ramp configured to facilitate removal of the strap body from the pocket upon twisting the strap body toward the second ramp.

14. The cable tie of claim 10, wherein the strap body further comprises an end portion positioned at the second end, the end portion selected from the group consisting of a handle, a fastener, a clip, a fitting, a threaded portion, a notched portion, a loop, and combinations thereof.

15. The cable tie of claim 10, comprising a material selected from the group consisting of nylon, polypropylene, polyethylene, polyvinyl chloride (PVC), polyolefin, polyurethane, chloroprene, polychloroprene, ethylene tetrafluoroethylene (ETFE), polyoxymethylene (POM), polyamide, polyester, polyaryletherketone (PAEK), polyether ether ketones (PEEK), ethylene chlorotrifluoroethylene (ECTFE), polyvinylidene fluoride, polyvinylidene difluoride (PVDF), thermoplastic elastomer, thermoset elastomer, rubber, cross-linked foam, thermoplastic foam, metal, composite, and combinations thereof.

* * * * *